United States Patent Office 3,301,850
Patented Jan. 31, 1967

3,301,850
17-OXYGENATED-5α-ANDROSTANE-2α,3α-EPISULFIDES
Paul D. Klimstra, Northbrook, Ill., assignor to G. D. Searle & Co., Chicago, Ill., a corporation of Delaware
No Drawing. Filed Dec. 1, 1964, Ser. No. 415,202
5 Claims. (Cl. 260—239.5)

The present invention is concerned with novel steroidal compounds characterized by a (substituted-oxy) function at the 17-position and more particularly with 17-oxygenated-5α-androstane-2α,3α-episulfides of the following structural formula

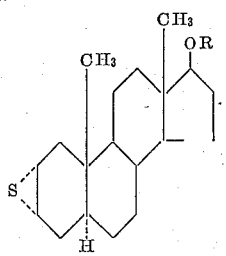

wherein R can be a lower alkyl, tetrahydropyran-2-yl or radical of the formula

X being a (lower cycloalkyl)(lower alkylene), phenyl, cinnamyl, trifluoromethyl, 4 - (tertiary - butyl)phenoxymethyl, or 2,4-dinitrophenoxymethyl radical.

The lower alkyl radicals embraced in the foregoing representation are typified by methyl, ethyl, propyl, butyl, pentyl, hexyl, and the branched-chain isomers thereof. Examples of the lower cycloalkyl radicals therein depicted are cyclopentyl and cyclohexyl. Lower alkylene radicals encompassed in that structural formula are exemplified by methylene, ethylene, trimethylene, tetramethylene, pentamethylene, and the corresponding branched-chain isomers.

A starting material suitable for the manufacture of the instant compounds is 2β,3β-epoxy-5α-androstan-17β-ol. That substance is contacted with an ethereal solution of thiocyanic acid to afford 3α-thiocyanato-5α-androstane-2β,17β-diol, which is allowed to react with potassium hydroxide in aqueous methanol to produce 2α,3α-epithio-5α-androstan-17β-ol.

The compounds of this invention can be obtained by contacting the latter 17β-hydroxy intermediate at low temperature with the appropriate acid anhydride or halide in a suitable basic organic solvent medium. Thus, a pyridine solution of 2α,3α-epithio-5α-androstan-17β-ol is allowed to react with β-cyclopentylpropionyl chloride to afford the instant 17-(β-cyclopentylpropionate). When trifluoroacetic anhydride is substituted for the aforementioned acid chloride, the 17-trifluoroacetate is produced.

An alternate route to the instant compounds utilizes 17-oxygenated-5α-androstan-3-ones of the following structural formula

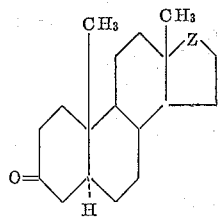

as intermediates. In that representation Z can be a carbonyl, β-hydroxymethylene or β-(substituted-oxy)-methylene group. Halogenation of those ketones by reaction with bromine in acetic acid containing hydrobromic acid affords the 2α-bromo derivatives. Replacement of the bromine atom by a thiocyanato group is effected by heating with potassium thiocyanate in acetone solution. The carbonyl group is then reduced by means of a suitable reagent to afford the 3β-hydroxy-2α-thiocyanato compounds, which are converted to the desired 2α,3α-epithio compounds by the cyclization reaction described above. As a specific example of this process, 17β - (β - cyclopentylpropion)oxy-5α-androstan-3-one is contacted with bromine in acetic acid containing a catalytic quantity of hydrobromic acid to yield 2α-bromo-17β - (β - cyclopentylpropion)oxy - 5α-androstan-3-one, which is heated with potassium thiocyanate in acetone to afford 17β-(β-cyclopentylpropion)oxy-2α-thiocyanato-5α-androstan-3-one, and that substance is reduced by means of lithium tri-(tertiarybutoxy) aluminum hydride in tetrahydrofuran to produce 17β-(β-cyclopentylpropion)oxy-2α-thiocyanato-5α-androstan-3β-ol. Cyclization of that substance by the process hereinbefore disclosed results in 2α,3α-epithio-5α-androstan-17β-ol 17-(β-cyclopentylpropionate).

The aforementioned 2α,3α-epithio-5α-androstan-17β-ol is converted to the corresponding 17-tetrahydropyran-2-yl ether by reaction with dihydropyran in the presence of a suitable acid catalyst such as p-toluenesulfonic acid.

The compounds of this invention display valuable pharmacological properties. They are hormonal agents, for example, as evidenced by their potent anabolic properties and possess the particular advantage of exhibiting only minimal androgenic, anti-estrogenic and anti-fertility side-effects. In addition, they are pepsin-inhibitory agents.

The invention will appear more fully from the examples which follow. These examples are set forth by way of illustration only and it will be understood that the invention is not to be construed as limited either in spirit or in scope by the details contained therein as many modifications in materials and methods will be apparent from this disclosure to those skilled in the art. In these examples temperatures are given in degrees centigrade (° C.) and quantities of materials in parts by weight unless otherwise noted.

*Example 1*

To a cold solution of 60 parts of potassium thiocyanate in 30 parts of water is added first 154 parts of ether, then 90 parts of 85% phosphoric acid in portions of about 18 parts. The mixture is shaken between each addition of phosphoric acid, and the purple ethereal layer is finally separated, washed with water and dried over anhydrous sodium sulfate. To that ether solution is added 5.6 parts of 2β,3β-epoxy-5α-androstan-17β-ol, and the resulting solution is kept at room temperature for about 3½ days. During this reaction period ether is added in order to maintain solution. After the reaction period is completed, the solution is washed with dilute aqueous sodium carbonate until neutral, then is washed with water. Drying over anhydrous sodium sulfate containing decolorizing carbon followed by distillation of the solvent at reduced pressure affords a solid residue. Recrystallization of that residue from acetone-hexane results in 3α-thiocyanato-5α-androstane-2β,17β-diol, melting at about 210–213°. This substance displays an optical rotation of +37.5° in chloroform.

Example 2

A mixture of 1 part of 3α-thiocyanato-5α-androstane-2β,17β-diol and 12 parts of methanol is warmed to effect solution, at which time a solution of 0.5 part of potassium hydroxide in 5 parts of water containing 12 parts of methanol is added. The resulting reaction mixture is allowed to stand at room temperature for about 2 hours, then is diluted with water. The precipitate which forms is collected by filtration, washed on the filter with water and dried in air to afford 2α,3α-epithio-5α-androstan-17β-ol, melting at about 128–130°. Recrystallization of that material from acetone-hexane affords a pure sample, melting at about 128–129°, and further characterized by an optical rotation of +27° in chloroform.

Example 3

A mixture consisting of 12 parts of 2α-bromo-5α-androstane-3,17-dione, 8 parts of potassium thiocyanate, and 320 parts of acetone is heated at the reflux temperature for about 6½ hours, then is cooled to room temperature and filtered in order to remove the precipitated inorganic salt. Partial concentration of the filtrate by distillation under reduced pressure followed by dilution with water results in precipitation of the crude product, which is collected by filtration, washed on the filter with water and dried in air. That crude material is recrystallized from ethyl acetate to afford 2α-thiocyanato-5α-androstane-3,17-dione, melting at about 212–214° with decomposition.

Example 4

To an ice-cold solution of 4 parts of 2α-thiocyanato-5α-androstane-3,17-dione in 90 parts of tetrahydrofuran is added a solution of 20 parts of lithium tri-(tertiary-butoxy) aluminum hydride in 90 parts of tetrahydrofuran. The reaction is continued with stirring for about one hour, following which time the mixture is poured into an ice-cold aqueous solution containing excess acetic acid. The mixture which results is extracted with ether, and the ether layer is separated, then washed successively with water, 5% aqueous sodium bicarbonate and water. Drying over anhydrous sodium sulfate followed by distillation of the solvent under reduced pressure affords the crude product as a white solid. Recrystallization from acetone-hexane produces pure 2α-thiocyanato-5α-androstane 3β,17β-diol, melting at about 202–205°. It is characterized further by an optical rotation, in chloroform, of +23°.

Example 5

To a solution of 1.6 parts of 2α-thiocyanato-5α-androstane-3β,17β-diol in 20 parts of methanol is added a solution of 0.6 part of potassium hydroxide in 8 parts of methanol, and the resulting reaction mixture is kept at room temperature for about 2 hours. Dilution with water followed by cooling to 0–5° results in crystallization of the crude product, which is collected by filtration, washed on the filter with water, and dried. Recrystallization from acetone-hexane affords pure 2α,3α-epithio-5α-androstan-17β-ol, identical with the product of Example 2.

Example 6

To a solution of 3 parts of 2α,3α-epithio-5α-androstan-17β-ol in 25 parts of pyridine is added, over a period of about 5 minutes with stirring and cooling at 0–5°, 1.7 parts of β-cyclopentylpropionyl chloride, and the resulting reaction mixture is allowed to warm to room temperature, then let stand for about 1½ hours. At the end of that time the reaction mixture is poured carefully into ice-cold water, and the precipitate which forms is collected by filtration, washed on the filter with water, and dried in air. Recrystallization of that crude product from aqueous acetone affords pure 2α,3α-epithio-5α-androstan-17β-ol 17-(β-cyclopentylpropionate), melting at about 146.5–148.5°. This compound displays infrared absorption maxima at about 3.40, 5.78, and 7.99 microns and is characterized further by the following structural formula

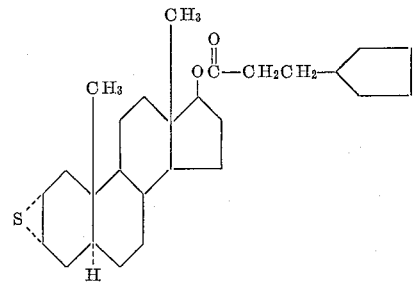

Example 7

By substituting an equivalent quantity of γ-cyclohexyl-butyryl chloride and otherwise proceeding according to the processes described in Example 6, there is obtained 2α,3α-epithio-5α-androstan-17β-ol 17-(γ-cyclohexylbutyrate).

Example 8

To a solution of 1.5 parts of 2α,3α-epithio-5α-androstan-17β-ol in 67 parts of methylene chloride is added 1.66 parts of dihydropyran and 0.01 part of p-toluenesulfonic acid monohydrate. The resulting reaction mixture is kept at room temperature for about 3 days, then is washed with water and dried over anhydrous sodium sulfate. Removal of the solvent by distillation under reduced pressure affords an oily residue. This crude material is purified by chromatography on a silica gel column followed by elution with 98% ethyl acetate in benzene. Recrystallization from methanol of the fraction isolated from that eluate affords 2α,3α-epithio-5α-androstan-17β-ol 17-tetrahydropyran-2-yl ether as a glass. This compound can be represented by the following structural formula

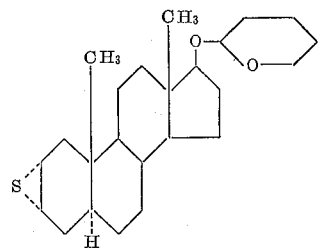

Example 9

To a solution of 3 parts of 2α,3α-epithio-5α-androstan-17β-ol in 50 parts of pyridine is added, with stirring and cooling, a solution of 9 parts of cinnamoyl chloride in 50 parts of pyridine. The reaction mixture is stored at room temperature for about 1½ hours, then is poured carefully into a mixture of ice and water. The precipitate which forms is collected by filtration, washed with water, and dried in air to afford the crude product. Chromatography of that material over silica gel followed by elution with 2% ethyl acetate in benzene and recrystallization from acetone affords pure 2α,3α-epithio-5α-androstan-17β-ol 17-cinnamate, melting at about 181–183°. This compound is further characterized by an optical rotation of +93° in chloroform and also by the following structural formula

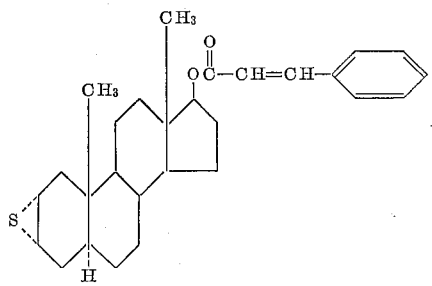

Example 10

To a solution of 3 parts of 2α,3α-epithio-5α-androstan-17β-ol in 50 parts of pyridine is added, with cooling and stirring over a period of about 5 minutes, 8 parts of benzoyl chloride. The resulting reaction mixture is kept at room temperature for about 30 minutes, then is poured carefully into a mixture of ice and water. Extraction of that aqueous mixture with ether affords an organic layer, which is washed successively with water, 5% aqueous sodium carbonate, dilute hydrochloric acid and water, then dried over anhydrous sodium sulfate. The solvent is removed by distillation under reduced pressure, and the residual yellow oil is purified by chromatography on silica gel followed by elution with 2% ethyl acetate in benzene. The resulting 2α,3α-epithio-5α-androstan-17β-ol 17-benzoate is characterized by infrared absorption maxima, in chloroform, at about 3.40, 5.83, 6.88, 7.80 and 11.10 microns and also by the following structural formula

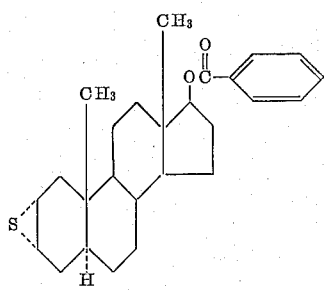

Example 11

To a solution of 3 parts of 2α,3α-epithio-5α-androstan-17β-ol in 27 parts of pyridine is added dropwise, over a period of about 5 minutes with cooling and stirring, 12 parts of trifluoroacetic acid anhydride. The resulting reaction mixture is stirred at room temperature for about 1½ hours, then is diluted with a mixture of 8 parts of water and 16 parts of dioxane. That mixture is further diluted with ice and water, then is extracted with ether. The ether layer is separated, washed successively with water, dilute hydrochloric acid, saturated aqueous sodium chloride, and 5% aqueous sodium bicarbonate, then dried over anhydrous sodium sulfate containing decolorizing carbon. The residual oil, remaining after removal of the solvent by distillation, solidifies on standing, and that crude product is purified by recrystallization from acetone. The resulting needle-like crystals of 2α,3α-epithio-5α-androstan-17β-ol 17-trifluoroacetate melt at about 106–108.5° and display infrared absorption peaks, in chloroform, at about 3.40, 5.60, 7.20, and 8.55 microns. This compound is represented by the following structural formula

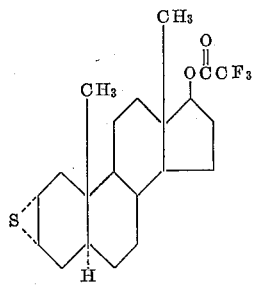

Example 12

To a solution of 3.75 parts of 2α,3α-epithio-5α-androstan-17β-ol in 30 parts of pyridine is added, at 0–5° over a period of about 5 minutes, 4 parts of p-(tertiary-butyl) phenoxyacetyl chloride, and the resulting reaction mixture is stirred for about 30 minutes. The precipitated salt is removed by filtration, and the filtrate is poured into a mixture of ice and water. The gummy precipitate which forms is extracted into ether, and the ether solution is washed successively with water, dilute hydrochloric acid and water, then dried over anhydrous sodium sulfate containing decolorizing carbon. The solid residue remaining after removal of the solvent is purified by recrystallization from aqueous acetone to afford 2α,3α-epithio-5α-androstan-17β-ol 17-p-(tertiary-butyl) phenoxyacetate, melting at about 135–137°. This compound is represented by the following structural formula

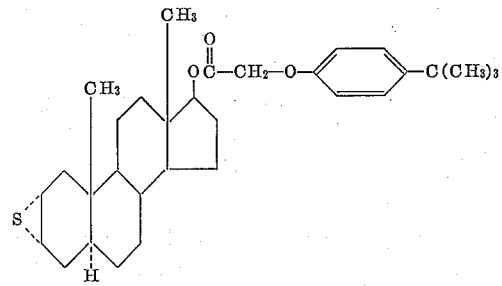

Example 13

By substituting an equivalent quantity of 2,4-dinitrophenoxyacetyl chloride and otherwise proceeding according to the processes described in Example 12, there is obtained 2α,3α-epithio-5α-androstan-17β-ol 17-(2,4-dinitrophenoxyacetate).

Example 14

A mixture of 2 parts of 17β-hydroxy-5α-androstan-3-one, 1.3 parts of potassium tertiary-butoxide, 6 parts of methyl iodide and 53 parts of benzene is heated at the reflux temperature for about 6 hours, then is cooled and filtered in order to remove the precipitated inorganic salt. The filtrate is diluted with a small amount of water, then is concentrated to dryness under reduced pressure to afford a semi-solid residue. That crude product is purified by chromatography on an alumina column followed by elution with 2.5% ethyl acetate in benzene. Recrystallization from aqueous methanol affords 17β-methoxy-5α-androstan-3-one, characterized by infrared absorption maxima, in chloroform, at about 3.40, 5.83, and 8.75 microns.

Example 15

To a solution of 10 parts of 17β-methoxy-5α-androstan-3-one in 105 parts of acetic acid containing 2 parts of 48% hydrobromic acid is added, at 0–5° over a period of about one hour, a solution of 4.5 parts of bromine and 2.5 parts of sodium acetate in 53 parts of acetic acid. At the end of the addition period, the reaction mixture is poured carefully into ice-cold water containing 5 parts of sodium acetate. The resulting precipitate is collected by filtration, washed with water and dried in air, then recrystallized from acetone to afford 2α-bromo-17β-methoxy-5α-androstan-3-one.

Example 16

The substitution of an equivalent quantity of 2α-bromo-17β-methoxy-5α-androstan-3-one in the procedure of Example 3 results in 17β-methoxy-2α-thiocyanato-5α-androstan-3-one.

Example 17

The reduction of an equivalent quantity of 17β-methoxy-2α-thiocyanato-5α-androstan-3-one according to the procedure described in Example 4 results in 17β-methoxy-2α-thiocyanato-5α-androstan-3β-ol.

Example 18

When an equivalent quantity of 17β-methoxy-2α-thiocyanato-5α-androstan-3β-ol is subjected to the process described in Example 5, there is obtained 2α,3α-epithio-5α-androstan-17β-ol 17-methyl ether.

Example 19

When an equivalent quantity of ethyl iodide is substituted in the procedure of Example 14, there is obtained 17β-ethoxy-5α-androstan-3-one which, when subjected to the successive processes of Examples 15–18, results in 2α,3α-epithio-5α-androstan-17β-ol 17-ethyl ether.

What is claimed is:
1. A compound of the formula

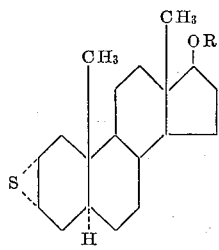

wherein R is selected from the group consisting of lower alkyl, tetrahydropyran-2-yl, and radicals of the formula

X being selected from the group of radicals consisting of β-cyclopentylpropionyltrifluoromethyl, p - (tertiary-butyl) phenoxymethyl, and 2,4-dinitrophenoxymethyl.

2. 2α,3α-epithio-5α-androstan - 17β - ol 17-trifluoroacetate.

3. 2α,3α-epithio-5α-androstan - 17β - ol 17 - tetrahydropyran-2-yl ether.

4. 2α,3α-epithio-5α-androstan-17β-ol 17-(β-cyclopentylpropionate).

5. 2α,3α-epithio-5α-androstan-17β-ol 17 - p - (tertiary-butyl)phenoxyacetate.

References Cited by the Examiner

UNITED STATES PATENTS

| 3,169,128 | 2/1965 | Komeno | 260—239.5 |
| 3,170,923 | 2/1965 | Cross | 260—239.55 |
| 3,178,415 | 4/1965 | Wettstein et al. | 260—239.55 |
| 3,178,457 | 4/1965 | De Stevens | 260—397.4 |
| 3,230,215 | 1/1966 | Komeno | 260—239.5 |

LEWIS GOTTS, *Primary Examiner.*

JOHNNIE R. BROWN, *Assistant Examiner.*